(12) United States Patent
Maurice

(10) Patent No.: US 6,675,940 B2
(45) Date of Patent: Jan. 13, 2004

(54) MANUAL RELEASE MECHANISM FOR A BRAKE

(75) Inventor: Kevin L. Maurice, Bristol, CT (US)

(73) Assignee: Inertia Dynamics, Inc., Collinsville, CT (US)

( * ) Notice: Subject to any disclaimer, the term of this patent is extended or adjusted under 35 U.S.C. 154(b) by 0 days.

(21) Appl. No.: 10/253,125

(22) Filed: Sep. 24, 2002

(65) Prior Publication Data

US 2003/0057037 A1 Mar. 27, 2003

Related U.S. Application Data

(60) Provisional application No. 60/324,812, filed on Sep. 24, 2001.

(51) Int. Cl.[7] .............................................. B60T 13/04
(52) U.S. Cl. ..................... 188/171; 188/72.7; 188/72.9; 188/156; 310/77
(58) Field of Search ............................... 188/171, 72.3, 188/156, 157, 158, 72.7, 72.9; 310/77

(56) References Cited

U.S. PATENT DOCUMENTS

| | | | |
|---|---|---|---|
| 3,608,679 A | * 9/1971 | Harrison | ..................... 188/171 |
| 3,724,620 A | 4/1973 | Benson, Jr. | |
| 4,476,965 A | 10/1984 | Brown, Jr. et al. | |
| 4,938,321 A | * 7/1990 | Kelley et al. | ................ 188/171 |
| 5,549,186 A | 8/1996 | Pardee | |
| 5,685,398 A | * 11/1997 | Marshall et al. | ............ 188/171 |
| 5,915,507 A | 6/1999 | Maurice et al. | |
| 6,125,965 A | * 10/2000 | Wang | .......................... 181/286 |
| 6,459,182 B1 | * 10/2002 | Pfann et al. | ................. 188/171 |

FOREIGN PATENT DOCUMENTS

| | | | |
|---|---|---|---|
| BE | 571346 A | 9/1958 | |
| JP | 55033955 A | 3/1980 | |

* cited by examiner

Primary Examiner—Christopher P. Schwartz
Assistant Examiner—Melanie Torres
(74) Attorney, Agent, or Firm—McCarter & English, LLP (57) ABSTRACT

The brake assembly includes a motor shaft connected to a friction disk assembly. Springs housed in a field cup assembly, frictionally link a clapper plate assembly and friction disk assembly against a mounting plate to activate the brake. To disengage the brake, the field cup assembly magnetically attracts the clapper plate thereto and the friction disk assembly is free to rotate. For manual release, rotation of a lever arm against a reaction plate compresses a wave spring to generate an opposing force which overcomes the springs, thereby forcing the clapper plate assembly away from the friction disk assembly to allow rotation thereof.

19 Claims, 9 Drawing Sheets

MANUAL RELEASE MECHANISM FOR A BRAKE

CROSS-REFERENCE TO RELATED APPLICATION

This application claims priority to U.S. Provisional Patent Application No. 60/324,812, filed Sep. 24, 2001, which is incorporated herein by reference.

FIELD OF THE INVENTION

The subject invention relates to brakes, and more particularly to an improved system for power off brakes with manual releases.

BACKGROUND OF THE RELATED ART

Power-off brakes are known in which electrical current to the brake serves to release the brake, which is otherwise activated. Such power-off brakes may be used when it is desirable that the brake be applied in the event of a power failure. For example, an electric wheelchair would desirably be braked in the event of a power failure to prevent accidental movement. However, subsequent movement of the wheelchair is often desired even though the power is off. Hence, there is a need to have the ability to manually release the power-off brake. U.S. Pat. No. 5,915,507 issued Jun. 29, 1999, which is incorporated herein by reference in its entirety, discloses a power-off brake with manual release. Further exemplary brake and brake-related patents include U.S. Pat. No. 6,161,659, issued Dec. 19, 2000; U.S. Pat. No. 6,125,975, issued Oct. 3, 2000; U.S. Pat. No. 5,979,630, issued Nov. 9, 1999; and U.S. Pat. No. 6,047,805, issued May 11, 2000, each of which is incorporated by reference herein in its entirety. Still further exemplary brake and brake-related patent applications include commonly assigned U.S. patent application Ser. No. 09/528,690, filed Mar. 20, 2000; U.S. patent application Ser. No. 09/841,507 filed Sep. 2, 2001; and U.S. patent application Ser. No. 09/773,722 filed Jan. 31, 2001, each of which is incorporated by reference herein in its entirety.

There are problems associated with prior art manual release brake mechanisms. Although they recognize the need to alleviate close manufacturing tolerances, and minimize the effects of wear, binding and/or poor release, each of these problems remains prevalent. There is a need, therefore, for an improved manual release mechanism which permits easy operation and assures adequate performance.

SUMMARY OF THE INVENTION

It is an object of the present disclosure to provide a manual release brake mechanism which provides flexible contact to thereby reduce the need for exact manufacturing tolerances and which will minimize component wear.

It is another object of the present disclosure to provide a manual release mechanism which generates a substantial amount of release pressure compared to the effort required to actuate the mechanism.

In one embodiment, a brake includes a manual release mechanism. The manual release mechanism has a lever arm for engaging a reaction plate wherein the rotational motion of the lever is translated into axial motion of the reaction plate which then compresses a bias element. The compression of the bias element generates a manual release force which opposes a braking force generated against a brake element by brake springs. When the manual release force overcomes the braking force, the brake element moves toward the lever arm to disengage the brake.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF PREFERRED EMBODIMENTS

The present invention overcomes many of the problems associated with prior art manual release brakes. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Figure 1:
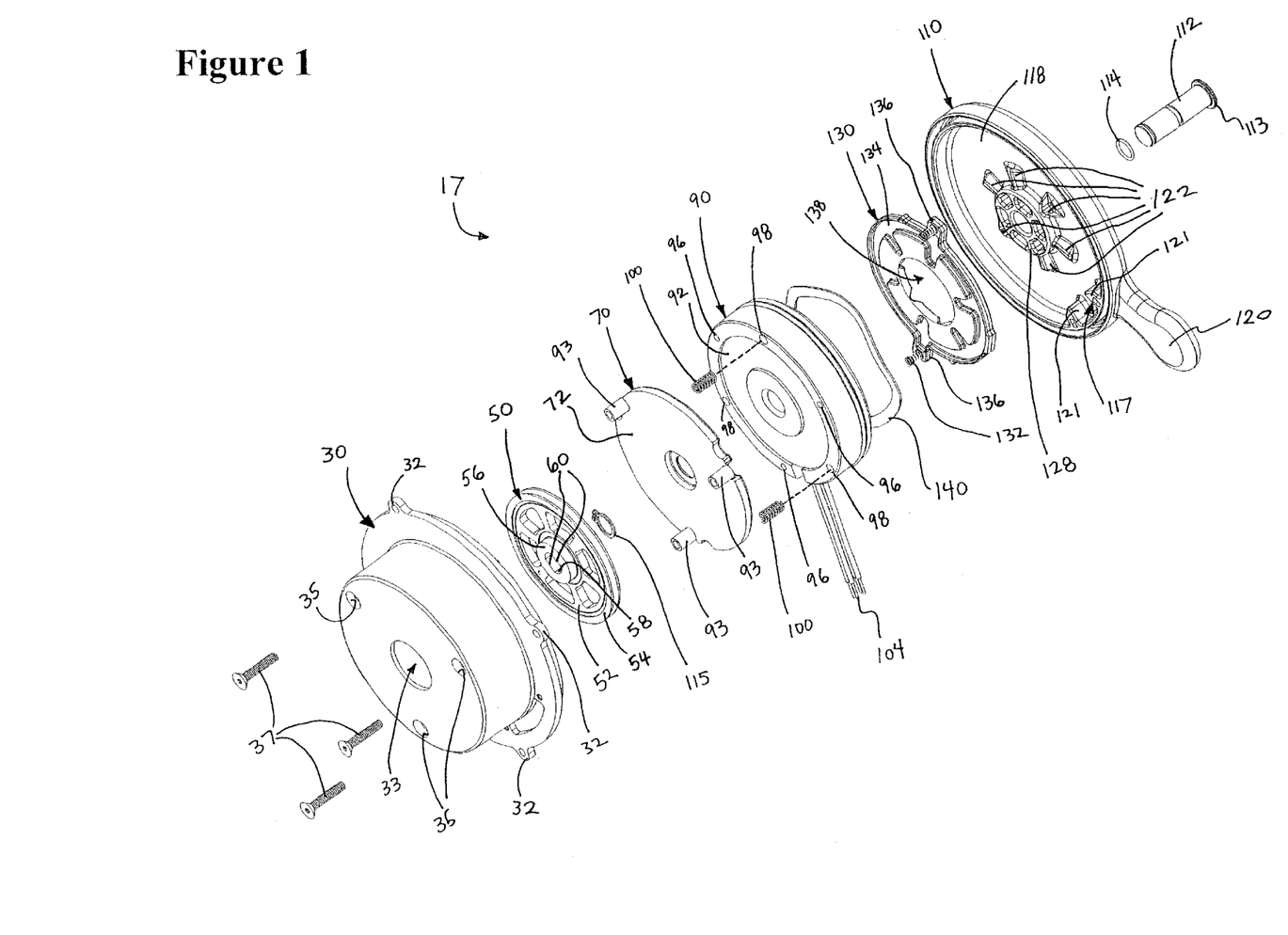
FIG. 1 is an exploded front perspective view showing the components of one representative embodiment of a brake assembly constructed in accordance with the subject disclosure.
Figure 2:
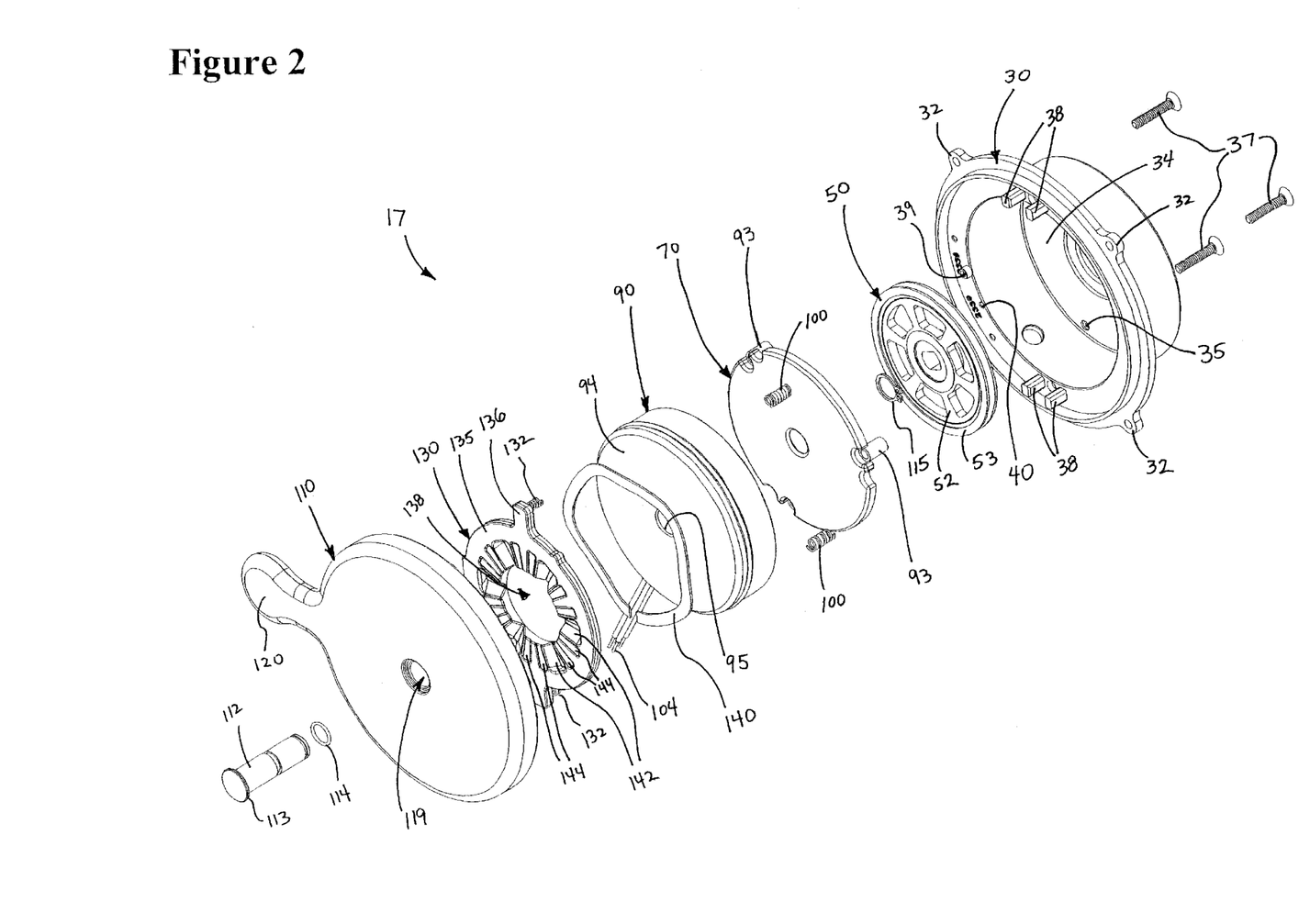
FIG. 2 is an exploded rear perspective view showing the components of the brake assembly of FIG. 1.

Referring to FIGS. 1 and 2, there is shown one representative brake assembly constructed in accordance with the subject disclosure and designated generally by reference numeral 17. In general, the brake assembly 17 includes a mounting plate assembly 30 housing a plurality of components and mounting the brake 17 to a motor (not shown) as is well known to those of ordinary skill in the pertinent art. In one embodiment, the brake assembly 17 is used on an electrical motor which powers a wheelchair. The mounting plate 30 is preferably a generally cylindrical cup with a rearward opening recess 33. The rearward opening recess 33 is defined by a bottom portion 34 of the mounting plate 30. The bottom portion 34 also defines three throughbores 35 for receiving threaded fasteners 37. Tabs 32 of the mounting plate assembly 30 operatively couple the brake 17 to the motor. Preferably, the mounting plate 30 is die cast aluminum. The mounting plate 30 houses a friction disk assembly 50 adjacent to the bottom portion 34.

The friction disc assembly 50 includes a body portion 52 and an annular friction ring 54. The body portion 52 has a hub 56 with a keyway 58 having two flats 60. The annular friction ring 54 can be any type of friction material which facilitates frictional linkages as is well known to those of ordinary skill in the pertinent art. Preferably, the annular friction ring 54 is a high coefficient friction material as disclosed in U.S. Pat. No. 6,161,659 which is included herein by reference. Preferably, the body portion 52 of the friction disk 50 is die cast aluminum. The hub 56 which extends at least partially into the recess 33 of the mounting plate 30 couples to the drive shaft of the motor such that the friction disk assembly 50 rotates with the drive shaft but is free to move axially. When the brake 17 engages, the friction disc assembly 50 is biased by a clapper plate assembly 70 against the mounting plate 30 to create a frictional linkage therewith which arrests the drive shaft.

A field cup assembly 90 selectively pushes the clapper plate 70 into engagement with the friction disk 50. The field cup assembly 90 includes a front face 92 and a rear face 94. The front face 92 of the field cup 90 includes tapped holes 96 for bolting the field cup 90 in position, preferably onto the mounting plate 30. When assembled, the field cup 90 is secured to the mounting plate 30 and the axial distance is set by standoffs 93 with the clapper plate 70 therebetween. The front face 92 of the field cup 90 also comprises three bores 98 to receive three springs 100 (only two shown for simplicity). Each bore 98 is shallower in depth than the height of the spring 100 in order to fix the spring 100 in place while still allowing a portion of the spring 100 to extend out of the bore 98. Thus, the three springs 100 within the bores apply force to bias the clapper plate 70. The field cup 90 is presently preferably constructed of steel or other ferromagnetic material in order to conduct magnetic flux.

Preferably, the field cup 90 is made from lathed magnetic steel. The clapper plate 70 is preferably a stamped steel disk. The clapper plate 70 is free to move axially. The clapper plate assembly 70 is constructed of steel or other ferromagnetic material in order to interact with magnetic flux as is known in the art. The magnetic flux generated by the field cup assembly 90 is at least sufficient to attract the clapper plate 70 to overcome the bias of the three springs 100 when energized. For creating the magnetic field, the field cup 90 includes a redundant coil assembly 102 which creates the magnetic field (see FIG. 5). The coil 102 includes electrical leads 104 for passing current therethrough to create the magnetic field.

In normal operation, when the brake assembly 17 is engaged, (i.e. deenergized), the clapper plate 70 is frictionally linked to the friction disc assembly 50 by the three springs 100. When the brake assembly 17 is disengaged, the clapper plate assembly 70 is pulled against the front face 92 of the field cup 90 by the force of the magnetic field generated thereby. In one presently preferred embodiment, cut outs 72 in the clapper plate 70 are provided to allow clearance for the standoffs 93.

In addition to the above features, the brake 17 can be manually released, (i.e. released without the use of electrical power to the field cup 90). The manual release mechanism, includes a lever arm assembly 110 coupled to the clapper 70 by a shaft 112. The shaft 112 includes an o-ring 114 to insure a proper fit and a retaining ring 115 for retaining the front end within the clapper 70 and a shoulder 113 formed on the rear end to retain the shaft 112 within a central bore 119 of the lever arm 110. In another embodiment, the shaft 112 is integral with lever arm assembly 112.

The lever arm 110 houses a reaction plate assembly 130 and a wave spring 140 to facilitate the manual release of the brake 17. The reaction plate 130 is adjacent the lever arm 110 and the wave spring 140 is adjacent the field cup 90. The reaction plate 130 is a generally spherically shaped disk having a channel in a front side 134 for receiving the wave spring 140. Preferably, the reaction plate 130 is zinc die cast, powder metal cast or bronze cast. The rear face 94 of the field cup 90 defines an annular channel 106 for locating the wave spring 140. The rear face 94 also defines a central opening 95 for receiving the shaft 112.

The reaction plate 130 forms tabs 136 which are received between bosses 38 mounted on the forward side of the mounting plate 30 to prevent rotation of the reaction plate 130 while still allowing the reaction plate 130 to move axially. In another embodiment, the reaction plate 130 is keyed to the field cup assembly 90 to prevent rotation. Preferably, anti-rattle springs 132 are positioned between the tabs 136 of the reaction plate 130 and the mounting plate 30 to prevent looseness of the reaction plate 130 which may generate undesirable rattle. Preferably, the anti-rattle springs 132 apply light axial pressure to the reaction plate 130 in the direction of the lever arm 110. The anti-rattle springs 132 ideally have a low spring rate in order to give the lever arm 110 a feel that is not loose and allows for some axial tolerance stack-up without reducing the torque of the brake 17 by greatly opposing the springs 100.

The rear side 135 of the reaction plate 130 forms six groups of indentations for interacting with the lever arm assembly 110. Each group of indentations includes a central major indentation 142 with adjacent minor indentations 144 on each side thereof. The adjacent minor indentations 144 create a positive lock on the manually released position as will be described further below. In another embodiment, there are no adjacent minor indentations. The number of groups of indentation may be varied and still achieve the desired results as would be appreciated by those of ordinary skill in the art upon review of the subject disclosure.

The lever arm 110 is a generally cup-shaped body 118 having a handle 120 extending radially therefrom. It is envisioned that the handle 120 will be manually activated although it will be appreciated that the handler 120 may also be activated by an apparatus. Six ramps 122 are defined on the rearward inner face 124 of the lever arm 110 for interacting with the groups of indentations of the reaction plate 130. The ramps 122 extend out radially from a central boss 128 formed on the lever arm 110 about the central opening 119. The bore 138 of the reaction plate 130 will pivot on the central boss 128 formed for holding the components concentric. Preferably, the lever arm 110 is molded plastic.

In a preferred embodiment, an electrical board is mounted to the mounting plate 30 with conventional fasteners. The electrical board interfaces with a controller via electrical leads 150 (see FIG. 3) and includes hall effect sensors for determining the position of the lever arm 110. Magnets (not shown) attached to the lever arm 110 interact with the hall effect sensors to provide a signal indicating the position of the lever arm 110. The two positions of the lever arm assembly 110 are operational (i.e., not manually released) and manually released. It will be appreciated by those skilled in the art that any suitable sensor such as an optical sensor may be used to determine the location of the lever arm 110.

Figure 3:
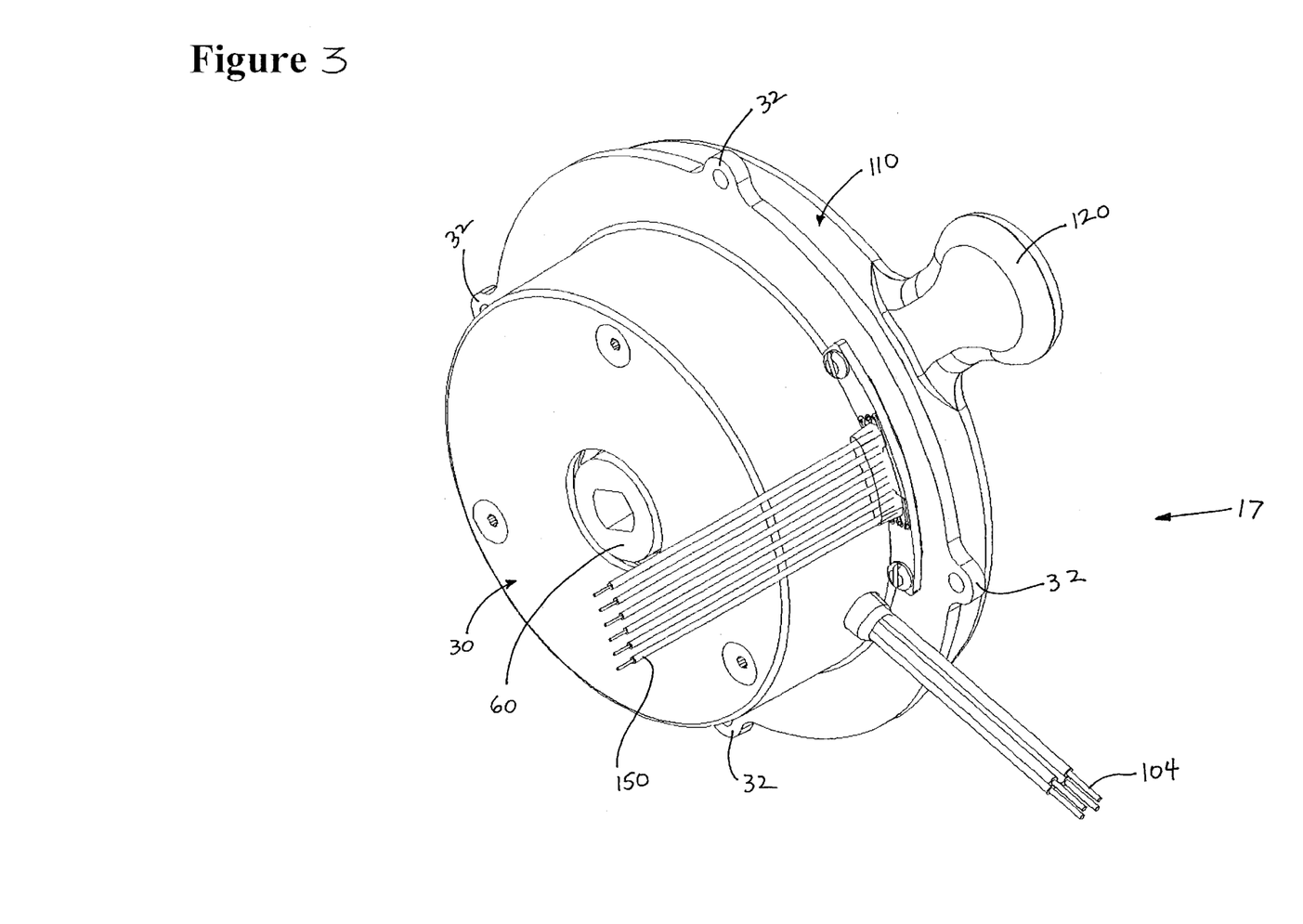
FIG. 3 is a perspective view of the brake assembly of FIG. 1 in an assembled state.

Referring now to FIG. 3, when assembled, the mounting plate 30 and lever arm 110 couple to substantially enclose the components of the brake 17 and prevent inadvertent pinching and maintain cleanliness. The shaft 112 passes through the central opening 119 of the lever arm 110, the reaction plate 130, the wave spring 140, the field cup 90 and the clapper 70. The shoulder 113 on the shaft 112 retains the shaft 112 in the central opening 119 of the lever arm 110. The retaining ring 115 secures the rearward end of the shaft 112 to the front side 72 of the clapper plate 70 while allowing each component to move rotationally and axially. The threaded fasteners 37 couple the field cup 90 to the mounting plate 30 which is secured by the tabs 32 to a stationary portion of the apparatus upon which the brake 17 is utilized. The brake 17 is preferably attached to the motor housing. Hub 56 of the friction disk 50 couples to the drive shaft of the motor as would be appreciated by those of ordinary skill in the pertinent art based upon review of the subject disclosure.

Figure 4:
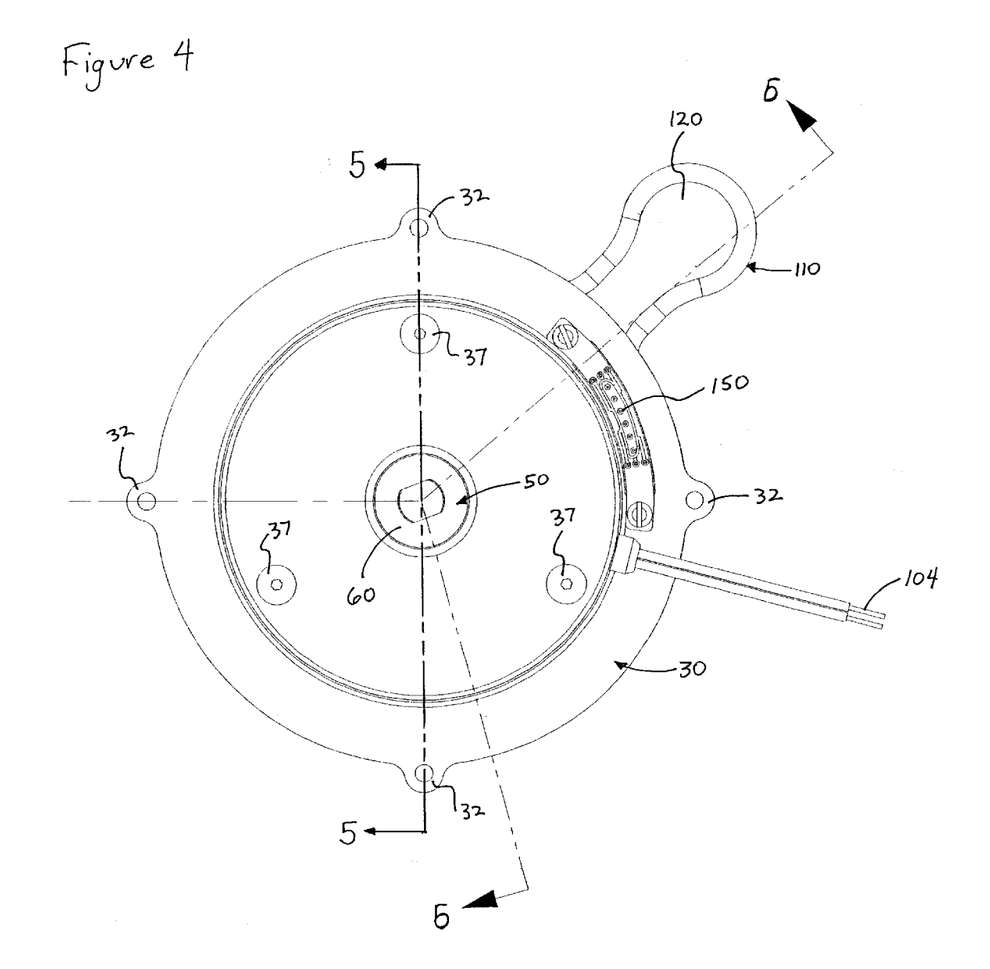
FIG. 4 is a front view of the assembled brake assembly of FIG. 1 in the operational position.
Figure 5:
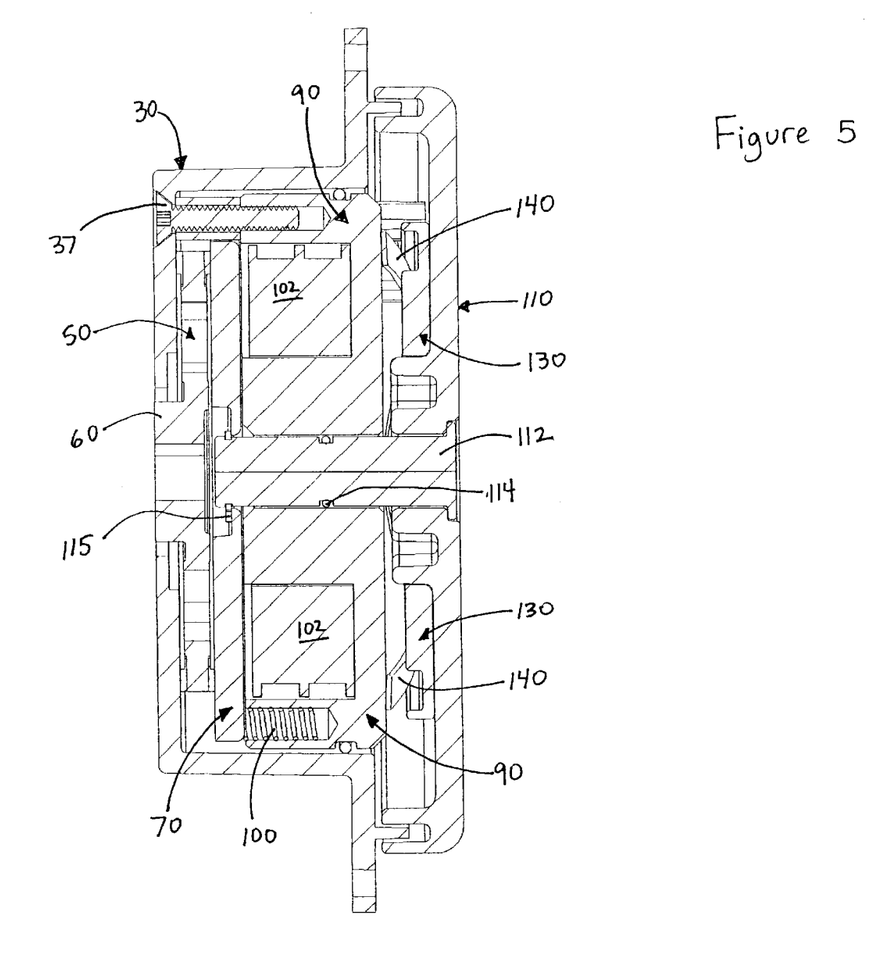
FIG. 5 is a cross-sectional view of the brake assembly taken along line 5—5 of FIG. 4.
Figure 6:
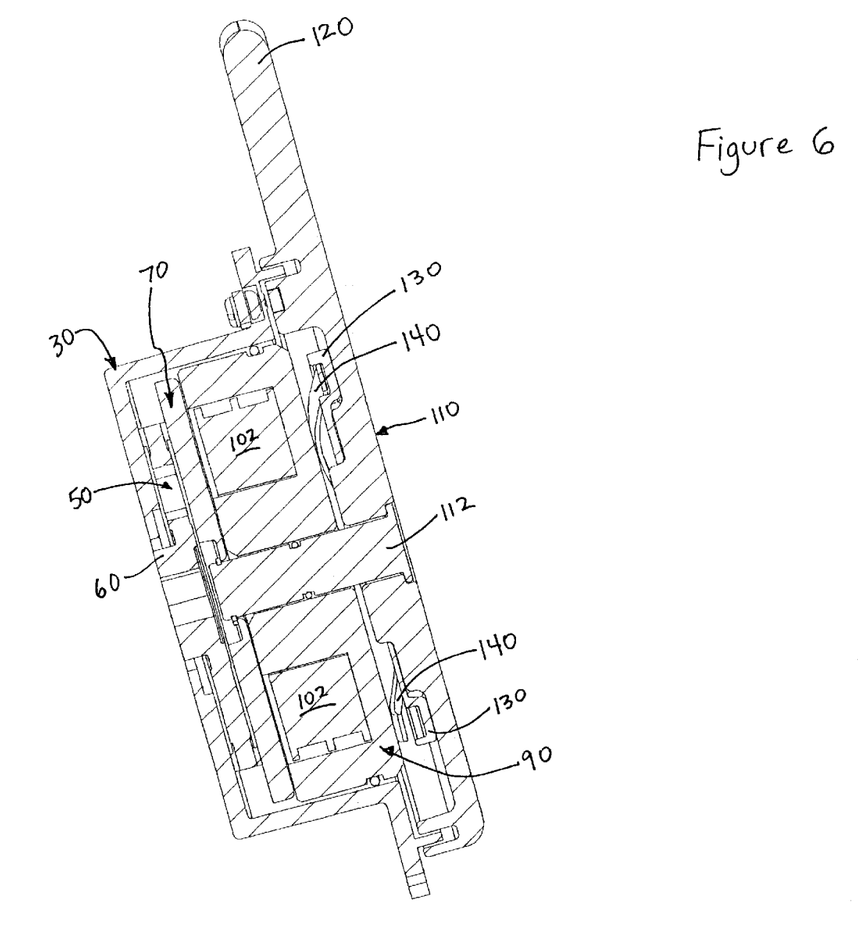
FIG. 6 is a cross-sectional view of the brake assembly taken along line 6—6 of FIG. 4.

Referring now to FIGS. 4–6, in normal operation, i.e., with the manual release mechanism not affecting operation, the ramps 122 of the lever arm 110 are received within the major indentations 142 of the reaction plate 130. When no power flows through the coil 102, the brake 17 is engaged. The springs 100 move the clapper plate 70 towards the friction disc 50. The clapper plate 70 engages the friction disk 50 to move the friction disk 50 towards the mounting plate 30. As a result, the friction disc 50 frictionally engages the mounting plate 30 and the clapper plate 70. The frictional links between the clapper plate 70 and the friction disk assembly 50, and the friction disk 50 and the mounting plate 30 prevent the friction disc assembly 50 and thereby the drive shaft of the electrical motor from rotating. Under these conditions, the brake assembly 17 is in a static engaged state, i.e. no current passes through the coil 102. The three springs 100 supply the energy to the clapper plate 70 to hold the friction disc 50 against the mounting plate 30 and thereby the drive shaft of the electrical motor.

In the static engaged operational state, the ramps 122 of the lever arm 110 remain within the major indentations 142 of the reaction plate 130 to minimize the combined height of these two components. Hence, the compression of the wave spring 140 and resulting force generated by the wave spring 140 is reduced to a level below the force generated by the springs 100. As a result, the coupling between the lever arm 110 and clapper plate 70 by the shaft 112 does not limit the effect of the springs 100 on the clapper plate 70.

To electrically disengage the brake assembly 17, the controller sends current through the coil 102 of the field cup 90. The current passing through the coil 102 creates a magnetic field having flux lines. Generally, the flux lines radiate out from the field cup 90, cross through the clapper plate 70 and return to the field cup assembly 90 to complete a circuit. The magnetic field attracts the clapper plate 70 towards the front face 92 of the field cup 90. In effect, the field cup 90 acts as a powerful magnet pulling the clapper plate 70 against the front face 92 despite the force of the springs 100. As a result, the springs 100 become compressed until the clapper plate 70 contacts the front face 92. When the clapper plate 70 engages the field cup assembly 90 in this manner, a gap is formed between the clapper plate 70 and the friction disk 50. No frictional linking occurs between the clapper plate 70 and the friction disk 50 because of the gap. As a result, the friction disc assembly 50 is free to rotate with the drive shaft of the electrical motor without mechanical interference.

To engage the brake 17 again, the controller stops the flow of current to the field cup assembly 90. The holding power of the magnetic field decreases greatly and the clapper plate assembly 70 is biased towards the friction disk 50 by the springs 100. Eventually, the magnetic field continues to degrade because of the increased distance from the front face 122 of the field cup assembly 90 and the lack of current to the coil 102 until the magnetic field from the field cup 90 becomes non-existent and the springs 100 bias the clapper plate 70 against the friction disc 50 as described above.

Figure 7:
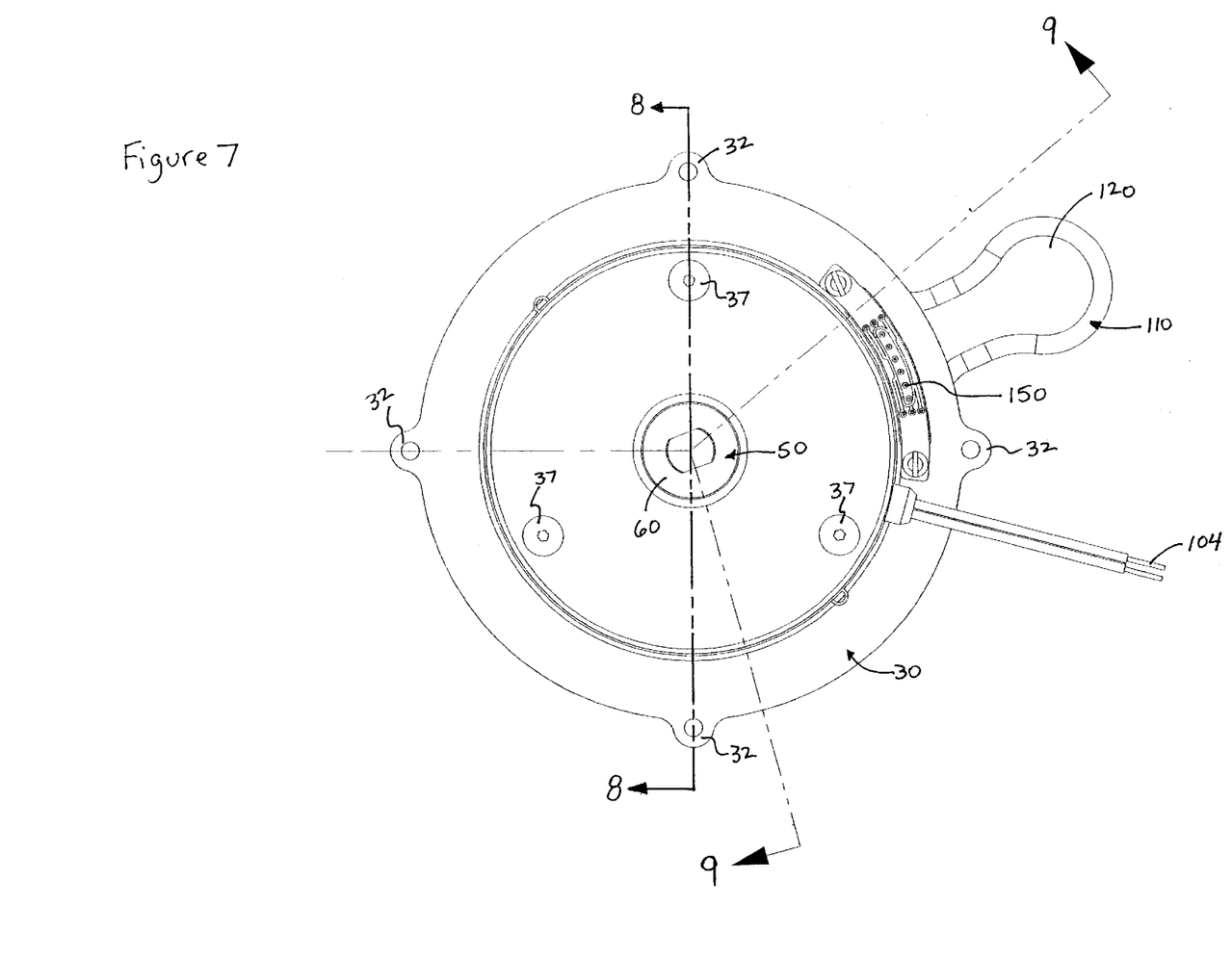
FIG. 7 is a front view of the assembled brake assembly of FIG. 1 in the manually released position.
Figure 8:
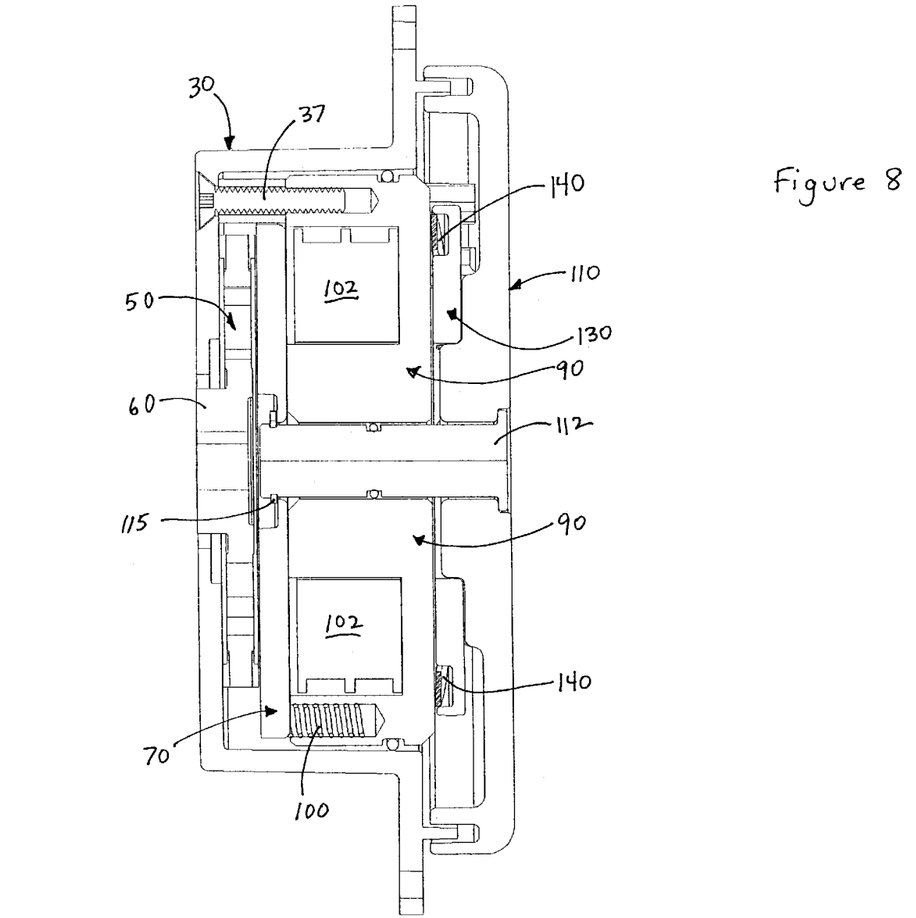
FIG. 8 is a cross-sectional view of the brake assembly taken along line 8—8 of FIG. 7.
Figure 9:
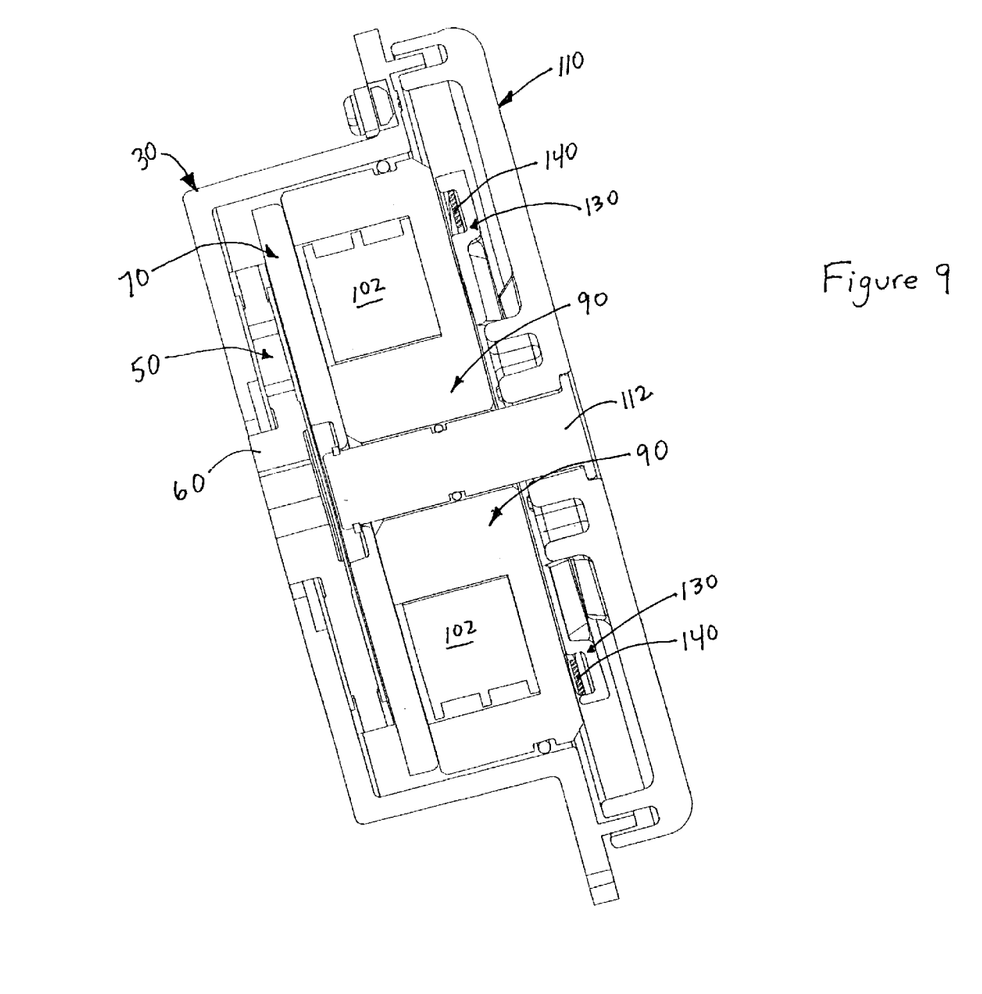
FIG. 9 is a cross-sectional view of the brake assembly taken along line 9—9 of FIG. 7.

Referring now to FIGS. 7–9, to manually disengage the brake assembly 17, the handle 120 of the lever arm 110 is rotated. The rotation may be in either direction because minor indentations 144 are located on both sides of the major indentations 142. Similarly, in an embodiment with no minor indentations, the rotation may be in either direction. A stop 39 may be secured to the mounting plate 30 to limit the rotation to a single direction. The stop 39 mounts within a hollow 117 formed between bumper features 121 on the lever arm 110 to limit over travel and restrict manual disengagement to only one direction of rotation of the handle 61 of the lever arm assembly 110 as best shown in FIGS. 1 and 2. The stop 39 may be a roll pin, socket head cap screw and the like as would be appreciated by those of ordinary skill in the pertinent art. An additional bore 40 is formed in the mounting plate 30 to allow for varying the selection of the direction of rotation of the lever arm 110 while still allowing restriction of over travel.

As the handle 120 is rotated, the ramps 122 of the lever arm 110 cam out of the major indentations 142 of the reaction plate 130. Preferably, a positive lock of the manually release position occurs as the ramps 122 come to rest in the minor indentations 144. The shallower depth of the minor indentations 144 generates an axial movement of the reaction plate 130 towards the mounting plate 30. Preferably, the movement of the reaction plate 130 is greater than the axial air gap between the clapper plate 70 and field cup assembly 90 when in the electrically disengaged state.

The movement of the reaction plate 130 generates an axial force upon the wave spring 140 causing the wave spring 140 to compress. The compression of the wave spring 140 generates a wave spring force. Preferably, the wave spring 140 has a very high spring rate and even a few thousands of compression generates significant force. The wave spring force opposes the force generated by the springs 100 which is at the front portion of the brake 17 applying pressure to the clapper plate 70. The wave spring force is transmitted to the springs 100 through the reaction plate 130 to the lever arm 110 which is coupled to the clapper plate 70 by the shaft 112 and retaining ring 115. When the wave spring force exceeds that of the force generated by the springs 100, the pull on the clapper plate 70 overcomes the springs 100. As a result, the clapper plate 70 moves toward the lever arm 110. The springs 100 are compressed and the air gap between the clapper plate 70 and friction disk 50 reforms. Hence, the friction disk 50 and thereby the drive shaft become free to rotate. Further, the compression of the wave spring 140 generates additional clearance which loosens manufacturing tolerances and allows for continued operation after wear of components such as, without limitation, the ramps 122 of the lever arm 110 and indentations 142, 144 of the reaction plate 130.

The brake 17 generates significantly more force than is nominally required for release. The compression of the springs 100 and wave spring 140 determines the distance of travel and such a distance of travel allows for wear of ramps and, consequently, long life as well as acceptable manufacturing tolerances. The reasonably loose tolerancing of the component parts allows for cost efficient manufacturing. Preferably, the brake assembly does not bottom out when compressing the wave spring 140 or springs 100 and therefore the maximum axial force which the lever arm 110, shaft 112 or retaining ring 115 endures is equal to the force generated by the wave spring 140 when at maximum compression (i.e. minimum height). By adjusting ramp height and contour of the contact surface as well as adding lubricants, coatings, and proper selection of fabrication materials, extensive life and less forceful operation are obtained. For cost effectiveness, molded parts should be chosen to form features without adding to the part count or requiring additional machining.

It will be appreciated by those of ordinary skill in the art upon review of the subject disclosure that the cam action of the ramps 122 with the groups of indentations may be done with other features such as, without limitation, a ball bearing-cavity combination. It will be appreciated by those of ordinary skill in the art upon review of the subject disclosure that the springs 100 and wave spring 140 may be substituted by any type of bias element with sufficient spring rate and force such as, without limitation, flexure springs, leaf springs elastomeric or rubber bumpers and the like.

While the invention has been described with respect to preferred embodiments, those skilled in the art will readily appreciate that various changes and/or modifications can be made to the invention without departing from the spirit or scope of the invention as defined by the appended claims.

What is claimed is:

1. A power-off brake with an override release mechanism comprising:
    a friction disk attachable to an elongated drive shaft for rotating about an axis, the friction disk having a first surface and a second surface substantially perpendicular to the axis;
    a clapper adjacent to the second surface of the friction disk;
    a field assembly having a first side positioned adjacent to the clapper to pull the clapper away from the friction disk when current is passed therethrough such that the friction disk is free to rotate;
    a first bias element for generating a first bias force between the clapper and the field assembly to push the clapper against the friction disk when no current is passed through the field assembly such that the friction disk is not free to rotate;
    a reaction plate assembly including
        a reaction plate having a first side adjacent to a second side of the field assembly, and a second side with at least one feature, and
        a second bias element between the reaction plate and the field assembly for generating a second bias force between the reaction plate and the field assembly; and
    a release plate adjacent to the second side of the reaction plate, the release plate being coupled to the clapper to selectively facilitate release of the friction disk when no current flows through the field assembly, the release plate having at least one actuator for selectively engaging the at least one feature of the reaction plate, wherein when the release plate is rotated, the at least one actuator cams against the at least one feature thereby moving the reaction plate towards the clapper which compresses the second bias element, as the second bias element compresses the second bias force increases such that as the second bias force becomes greater than the first bias force, the first bias element compresses and thereby the clapper moves away from the friction disk to allow rotation thereof.

2. A power-off brake as recited in claim 1, further comprising an annular ring of friction material mounted on the first surface of the friction disk.

3. A power-off brake as recited in claim 1, further comprising a mounting plate for coupling to a motor housing, the mounting plate being adjacent to the first surface of the friction disk.

4. A power-off brake as recited in claim 3, wherein frictional linking occurs between the mounting plate and the friction disk when no current passes through the field assembly.

5. A power-off brake as recited in claim 1, wherein the at least one feature is six pairs of indentations, each pair having a major ramp and at least one minor ramp adjacent thereto.

6. A power-off brake as recited in claim 1, wherein the at least one feature is a cavity and the at least one actuator is a ball bearing.

7. A power-off brake as recited in claim 1, wherein the at least one actuator is a ramp.

8. A power-off brake as recited in claim 1, wherein the first bias element is a plurality of springs.

9. A power-off brake as recited in claim 1, wherein the second bias element is a wave spring.

10. A power-off brake as recited in claim 1, wherein the at least one feature is an indentation.

11. A power-off brake as recited in claim 1, further comprising a third bias element between the reaction plate and the lever arm for preventing looseness.

12. An override release mechanism for a brake comprising:
    a field assembly having a front face and back face;
    a clapper biased away from and adjacent to the front face of the field assembly for actuating the brake;
    a reaction plate having a first side adjacent to the back face of the field assembly and a second side with at least one feature;
    a compressible element between the reaction plate and the field assembly for generating a force upon compression;
    a lever arm adjacent to the second side of the reaction plate, the lever arm having at least one actuator to selectively engage the at least one feature of the reaction plate; and
    a coupling for transferring force from the lever arm plate to the clapper, wherein when the lever arm plate is moved the at least one actuator exits the at least one feature thereby moving the reaction plate towards the clapper which increases the force generated by the compressible element which is transferred to the clapper such that the clapper moves axially towards the lever arm.

13. An override release mechanism as recited in claim 12, further comprising sensors for determining position of the lever arm plate.

14. An override release mechanism as recited in claim 12, further comprising a stop in a fixed position with respect to the brake for limiting rotational travel of the lever arm.

15. A manual override mechanism for a power-off brake having a clapper plate, the mechanism comprising:
    a lever plate having first means for actuating the mechanism;
    a reaction plate having second means for interacting with the first means, the reaction plate being adjacent to the lever plate;
    third means for biasing located between the reaction plate and the power-off brake; and
    fourth means for coupling the lever plate to the clapper plate.

16. A manual override mechanism as recited in claim 15, wherein the first means is a cam surface.

17. A manual override mechanism as recited in claim 15, wherein the second means is a cam surface.

18. A manual override mechanism as recited in claim 15, wherein the third means is a spring.

19. A manual override mechanism as recited in claim 15, wherein the fourth means is a shaft.

* * * * *